US009998480B1

(12) United States Patent
Gates et al.

(10) Patent No.: US 9,998,480 B1
(45) Date of Patent: Jun. 12, 2018

(54) SYSTEMS AND METHODS FOR PREDICTING SECURITY THREATS

(71) Applicant: Symantec Corporation, Mountain View, CA (US)

(72) Inventors: Christopher Gates, Culver City, CA (US); Yining Wang, Los Angeles, CA (US); Nikolaos Vasiloglou, Atlanta, GA (US); Kevin Alejandro Roundy, El Segundo, CA (US); Michael Hart, Farmington, CT (US)

(73) Assignee: Symantec Corporation, Mountain View, CA (US)

( * ) Notice: Subject to any disclaimer, the term of this patent is extended or adjusted under 35 U.S.C. 154(b) by 133 days.

(21) Appl. No.: 15/055,653

(22) Filed: Feb. 29, 2016

(51) Int. Cl.
*H04L 29/06* (2006.01)
*G06N 7/00* (2006.01)
*G06N 99/00* (2010.01)

(52) U.S. Cl.
CPC ......... *H04L 63/1408* (2013.01); *G06N 7/005* (2013.01); *G06N 99/005* (2013.01)

(58) Field of Classification Search
CPC ............. H04L 63/1408; H04L 63/1425; H04L 63/1433; H04L 63/20; H04L 63/145; G06N 7/005; G06N 99/005
USPC .................................................... 726/22–25
See application file for complete search history.

(56) References Cited

U.S. PATENT DOCUMENTS

| 7,062,783 | B1 * | 6/2006 | Joiner | H04L 41/0213 709/224 |
| 7,073,198 | B1 * | 7/2006 | Flowers | H04L 63/1433 713/151 |
| 7,808,897 | B1 * | 10/2010 | Mehta | H04L 43/00 370/230 |
| 7,904,962 | B1 * | 3/2011 | Jajodia | H04L 41/12 709/223 |

(Continued)

OTHER PUBLICATIONS

Rainer Gemella et al., Large-Scale Matrix Factorization with Distributed Stochastic Gradient Descent, In Proceedings of the 17th ACM SIGKDD International Conference on Knowledge Discovery and Data Mining (pp. 69-77), ACM, Aug. 2011.

(Continued)

*Primary Examiner* — Hosuk Song
(74) *Attorney, Agent, or Firm* — FisherBroyles, LLP

(57) ABSTRACT

A computer-implemented method for predicting security threats may include (1) predicting that a candidate security target is an actual target of a specific security attack according to a non-collaborative-filtering calculation, (2) predicting that the candidate security target is an actual target of a set of multiple specific security attacks, including the specific security attack, according to a collaborative filtering calculation, (3) filtering, based on the specific security attack also being predicted by the non-collaborative-filtering calculation, the specific security attack from the set of multiple specific security attacks predicted by the collaborative filtering calculation, and (4) notifying the candidate security target to perform a security action to protect itself from another specific security attack remaining in the filtered set (Continued)

of multiple specific security attacks based on an analysis of the filtered set of multiple specific security attacks. Various other methods, systems, and computer-readable media are also disclosed.

20 Claims, 7 Drawing Sheets

(56) References Cited

U.S. PATENT DOCUMENTS

| | | | | |
|---|---|---|---|---|
| 8,191,141 | B2* | 5/2012 | Suit | G06F 21/566 |
| | | | | 726/23 |
| 8,201,257 | B1* | 6/2012 | Andres | G06F 21/56 |
| | | | | 726/23 |
| 9,015,846 | B2* | 4/2015 | Watters | G06F 21/554 |
| | | | | 726/22 |
| 9,386,030 | B2 | 7/2016 | Vashist et al. | |
| 9,396,332 | B2 | 7/2016 | Abrams et al. | |
| 9,525,697 | B2 | 12/2016 | Woolward et al. | |
| 2008/0262895 | A1 | 10/2008 | Hofmeister et al. | |
| 2011/0178942 | A1 | 7/2011 | Watters et al. | |
| 2014/0082730 | A1 | 3/2014 | Vashist et al. | |
| 2015/0286825 | A1 | 10/2015 | Freudiger et al. | |
| 2015/0310215 | A1 | 10/2015 | McBride et al. | |
| 2016/0162690 | A1 | 6/2016 | Reith et al. | |
| 2016/0205137 | A1 | 7/2016 | Babb et al. | |
| 2016/0226893 | A1 | 8/2016 | Warikoo et al. | |
| 2017/0006054 | A1 | 1/2017 | Stiansen | |
| 2017/0031565 | A1 | 2/2017 | Chauhan et al. | |

OTHER PUBLICATIONS

Yining Wang, et al; Systems and Methods for Predicting Security Threat Attacks; U.S. Appl. No. 14/974,583, filed Dec. 18, 2015.

Ivan Sanchez, et al., Towards Extracting Faithful and Descriptive Representations of Latent Variable Models, http://sameersingh.org/files/papers/knowlextr-krr15.pdf, (2015).

Sparse matrix, https://en.wikipedia.org/wiki/Sparse_matrix, as accessed Dec. 29, 2015, Wikipedia, (Dec. 30, 2003).

Albert Au Yeung, Matrix Factorization: A Simple Tutorial and Implementation in Python, http://www.quuxlabs.com/blog/2010/09/matrix-factorization-a-simple-tutorial-and-implementation-in-python/, as accessed Dec. 29, 2015, (Sep. 16, 2010).

Dheeraj kumar Bokde, et al., Role of Matrix Factorization Model in Collaborative Filtering Algorithm: A Survey, https://arxiv.org/ftp/arxiv/papers/1503/1503.07475.pdf, International Journal of Advance Foundation and Research in Computer (IJAFRC) vol. 1, Issue 6, (May 2014).

Yehuda Koren, et al, Matriz Factorizattion Techniques for Recommender Systems, http://www.columbia.edu/~jwp2128/Teaching/W4721/papers/ieeecomputer.pdf, Computer, vol. 42, Issue 8, IEEE Computer Society, (Aug. 2009).

Chapter 9—Recommendation Systems, http://infolab.stanford.edu/~ullman/mmds/ch9.pdf, (Dec. 16, 2010).

Yining Wang, et al; Systems and Methods for Attack Prediction Based on Community Features; U.S. Appl. No. 62/264,201, filed Dec. 7, 2015.

* cited by examiner

Sparse Matrix
400

| | Malware 402 | Malware 404 | Malware 406 | Malware 408 |
|---|---|---|---|---|
| Enterprise Organization 410 | 1 | | | |
| Enterprise Organization 412 | 1 | 1 | | |
| Enterprise Organization 414 | | | | |
| Enterprise Organization 416 | | | | |
| Enterprise Organization 418 | 1 | | | |
| Enterprise Organization 420 | | 1 | 1 | 1 |

Enterprise Counts
450

| | |
|---|---|
| Enterprise Organization 410 | 1 |
| Enterprise Organization 412 | 2 |
| Enterprise Organization 414 | 0 |
| Enterprise Organization 416 | 0 |
| Enterprise Organization 418 | 1 |
| Enterprise Organization 420 | 3 |

Malware Counts
460

| | |
|---|---|
| Malware 402 | 3 |
| Malware 404 | 2 |
| Malware 406 | 1 |
| Malware 408 | 1 |

Product Matrix
470

| | Malware 402 | Malware 404 | Malware 406 | Malware 408 |
|---|---|---|---|---|
| Enterprise Organization 410 | X | 2 | 1 | 1 |
| Enterprise Organization 412 | X | X | 2 | 2 |
| Enterprise Organization 414 | 0 | 0 | 0 | 0 |
| Enterprise Organization 416 | 0 | 0 | 0 | 0 |
| Enterprise Organization 418 | X | 2 | 1 | 1 |
| Enterprise Organization 420 | 9 | X | X | X |

*FIG. 4*

SYSTEMS AND METHODS FOR PREDICTING SECURITY THREATS

BACKGROUND

Individuals and organizations generally seek to protect their computing resources from security threats through a variety of traditional mechanisms. For example, enterprise organizations may protect computing resources by installing client-side antivirus software on employee computers. Similarly, enterprise organizations may establish a gateway-side firewall to protect the organizations from malicious network traffic.

Although the traditional methods of protecting computing resources from security threats have achieved some success, these traditional methods also suffer from some deficiencies. Importantly, these traditional methods are essentially retroactive. In other words, the traditional methods take remedial measures to repair damage after an attack has occurred. Similarly, the traditional methods may inoculate computing resources to render them invulnerable when the attacks finally occur. In all of these cases, however, the traditional methods do not predict details of which specific security attacks will occur or take proactive measures to prevent the security attacks from occurring. Accordingly, the instant disclosure identifies and addresses a need for additional and improved systems and methods for predicting security threats.

SUMMARY

As will be described in greater detail below, the instant disclosure generally relates to systems and methods for predicting security threats by, for example, performing both a non-collaborative-filtering calculation and a collaborative filtering calculation. Moreover, the disclosed systems and methods may improve the readability and insightfulness of the results of these calculations by filtering, from predictions generated by the collaborative filtering calculation, predictions that are generated by both calculations. Additionally, after generating the predictions using these calculations, the disclosed systems and methods may further use machine learning algorithms to correlate attributes of security threats and/or candidate security targets with predicted attacks, thereby revealing information about the features of the threats and/or targets that render a particular candidate security target vulnerable.

In one example, a computer-implemented method for predicting security threats may include (1) predicting that a candidate security target is an actual target of a specific security attack according to a non-collaborative-filtering calculation, (2) predicting that the candidate security target is an actual target of a set of multiple specific security attacks, including the specific security attack, according to a collaborative filtering calculation that makes predictions that are more customized to the candidate security target than predictions that the non-collaborative-filtering calculation makes, (3) filtering, based on the specific security attack also being predicted by the non-collaborative-filtering calculation, the specific security attack from the set of multiple specific security attacks predicted by the collaborative filtering calculation, and (4) notifying the candidate security target to perform a security action to protect itself from another specific security attack remaining in the filtered set of multiple specific security attacks based on an analysis of the filtered set of multiple specific security attacks.

In some examples, predicting that the candidate security target is the actual target of the specific security attack according to the non-collaborative-filtering calculation is based on both: (1) a count for the candidate security target, among candidate security targets under analysis, in terms of previous attacks on the candidate security target and (2) a count for the specific security attack, among security attacks under analysis, in terms of previous instances of the specific security attack. In some examples, predicting that the candidate security target is the actual target of the specific security attack according to the non-collaborative-filtering calculation may include calculating a product of the count for the candidate security target and the count for the specific security attack.

In some examples, filtering the specific security attack from the set of multiple specific security attacks predicted by the collaborative filtering calculation may include: (1) identifying overlapping specific security attacks that overlap between both a set of specific security attacks predicted according to the non-collaborative-filtering calculation and the set of multiple specific security attacks predicted according to the collaborative filtering calculation and (2) filtering each of the overlapping specific security attacks from the set of multiple specific security attacks predicted by the collaborative filtering calculation. In one embodiment, the analysis of the filtered set of multiple specific security attacks may include: (1) identifying attributes of the candidate security target and (2) calculating, according to a machine learning algorithm, a level of predictive power for each of the attributes in predicting specific security attacks remaining in the filtered set of multiple specific security attacks.

In one embodiment, the attributes include an identifier of a customer sector and/or an identifier of software installed by a customer. In further embodiments, the machine learning algorithm may include a naive Bayes algorithm.

In one embodiment, the analysis of the filtered set of multiple specific security attacks may include categorizing specific security attacks in the set of multiple specific security attacks into categories that each indicates a type of security attack. In one embodiment, the analysis of the filtered set of multiple specific security attacks may include: (1) identifying attributes of at least one of the multiple specific security attacks and (2) calculating, according to a machine learning algorithm, a level of predictive power for each of the attributes in predicting specific security attacks remaining in the filtered set of multiple specific security attacks. In a further embodiment, at least one of the non-collaborative-filtering calculation and the collaborative filtering calculation may include constructing a matrix that specifies: (1) candidate security targets along one of rows and columns of the matrix and/or (2) specific security attacks along the other of the rows and the columns of the matrix.

In one embodiment, a system for implementing the above-described method may include (1) a prediction module, stored in memory, that (A) predicts that a candidate security target is an actual target of a specific security attack according to a non-collaborative-filtering calculation and (B) predicts that the candidate security target is an actual target of a set of multiple specific security attacks, including the specific security attack, according to a collaborative filtering calculation that makes predictions that are more customized to the candidate security target than predictions that the non-collaborative-filtering calculation makes, (2) a filtering module, stored in memory, that filters, based on the specific security attack also being predicted by the non-collaborative-filtering calculation, the specific security attack from the set of multiple specific security attacks predicted by the collaborative filtering calculation, (3) a notification module, stored in memory, that notifies the candidate security target to perform a security action to protect itself from another specific security attack remaining in the filtered set of multiple specific security attacks based on an analysis of the filtered set of multiple specific security attacks, and (4) at least one physical processor configured to execute the prediction module, the filtering module, and the notification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) predict that a candidate security target is an actual target of a specific security attack according to a non-collaborative-filtering calculation, (2) predict that the candidate security target is an actual target of a set of multiple specific security attacks, including the specific security attack, according to a collaborative filtering calculation that makes predictions that are more customized to the candidate security target than predictions that the non-collaborative-filtering calculation makes, (3) filter, based on the specific security attack also being predicted by the non-collaborative-filtering calculation, the specific security attack from the set of multiple specific security attacks predicted by the collaborative filtering calculation, and (4) notify the candidate security target to perform a security action to protect itself from another specific security attack remaining in the filtered set of multiple specific security attacks based on an analysis of the filtered set of multiple specific security attacks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary sparse matrix and associated data that the disclosed systems may analyze to predict security threats.

Figure 1:
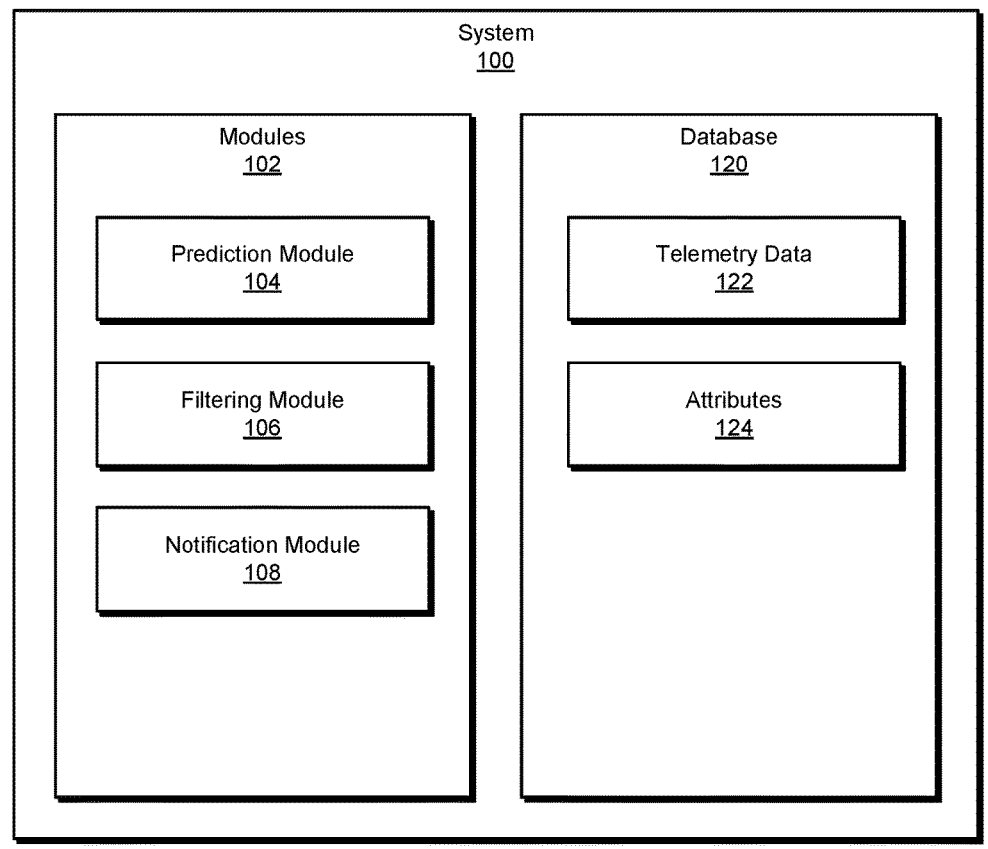
FIG. 1 is a block diagram of an exemplary system for predicting security threats.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for predicting security threats. As will be explained in greater detail below, the disclosed systems and methods may improve the readability and insightfulness of security threat predictions. Specifically, collaborative filtering prediction models for software and network security threats may reveal both (A) threats that are pervasive and relatively indiscriminate in their targets while widely affecting various enterprise organizations and (B) threats that are more uniquely targeted toward specific individuals and organizations or otherwise more effective against the specific individuals and organizations due to specific vulnerabilities. Accordingly, the disclosed systems and methods may filter the first set of predictions (A) from the totality of predictions to leave the second set of predictions (B). The disclosed systems and methods may thereby create the remaining filtered set of predictions (B) that are more insightful and customized toward specific security targets. Additionally, after creating the filtered set of predictions, the disclosed systems and methods may further perform one or more machine learning algorithms to match or correlate attributes of the security attacks and/or security targets to the remaining predictions, thereby making the overall predictions more readable and revealing the security attack features and/or security target vulnerabilities that make specific security targets especially susceptible to attack, as discussed further below.

Figure 2:
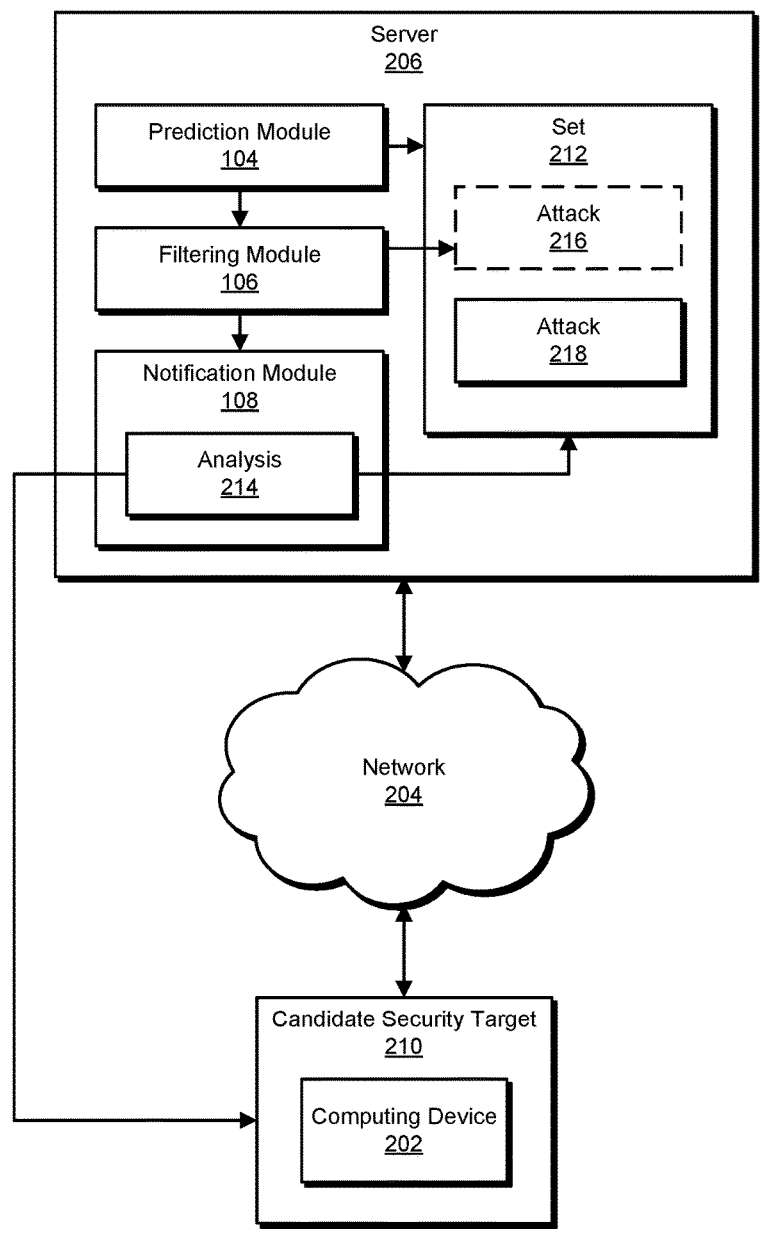
FIG. 2 is a block diagram of an additional exemplary system for predicting security threats.

The following will provide, with reference to FIGS. 1-2, detailed descriptions of exemplary systems for predicting security threats. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for predicting security threats. As illustrated in this figure, exemplary system 100 may include one or more modules 102 for performing one or more tasks. For example, and as will be explained in greater detail below, exemplary system 100 may also include a prediction module 104 that may (A) predict that a candidate security target is an actual target of a specific security attack according to a non-collaborative-filtering calculation and (B) predict that the candidate security target is an actual target of a set of multiple specific security attacks, including the specific security attack, according to a collaborative filtering calculation. The collaborative filtering calculation may make predictions that are more customized to the candidate security target than predictions that the non-collaborative-filtering calculation makes. Exemplary system 100 may additionally include a filtering module 106 that may filter, based on the specific security attack also being predicted by the non-collaborative-filtering calculation, the specific security attack from the set of multiple specific security attacks predicted by the collaborative filtering calculation. Exemplary system 100 may also include a notification module 108 that may notify the candidate security target to perform a security action to protect itself from another specific security attack remaining in the filtered set of multiple specific security attacks based on an analysis of the filtered set of multiple specific security attacks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store telemetry data 122, which may indicate data reported from client devices about events that occur at the client devices. For example, telemetry data 122 may indicate information about security threat and attack detection events at corresponding client devices. Similarly, database 120 may be configured to store attributes 124, which may indicate attributes of candidate security targets, such as enterprise organizations, as well as attributes of security threats, such as instances of malware, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to predict security threats. For example, and as will be described in greater detail below, prediction module 104 may predict that a candidate security target 210 is an actual target of a specific security attack, such as an attack 216, according to a non-collaborative-filtering calculation. Prediction module 104 may also predict that candidate security target 210 is an actual target of a set 212 of multiple specific security attacks, including attack 216, according to a collaborative filtering calculation that makes predictions that are more customized to candidate security target 210 than predictions that the non-collaborative-filtering calculation makes. Filtering module 106 may filter, based on attack 216 also being predicted by the non-collaborative-filtering calculation, attack 216 from set 212 of multiple specific security attacks predicted by the collaborative filtering calculation, as shown by the dashed lines around attack 216 in FIG. 2. Notification module 108 may notify candidate security target 210 to perform a security action to protect itself from another specific security attack, such as an attack 218, remaining in filtered set 212 of multiple specific security attacks based on an analysis 214 of filtered set 212 of multiple specific security attacks.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of facilitating the prediction of cybersecurity threats. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
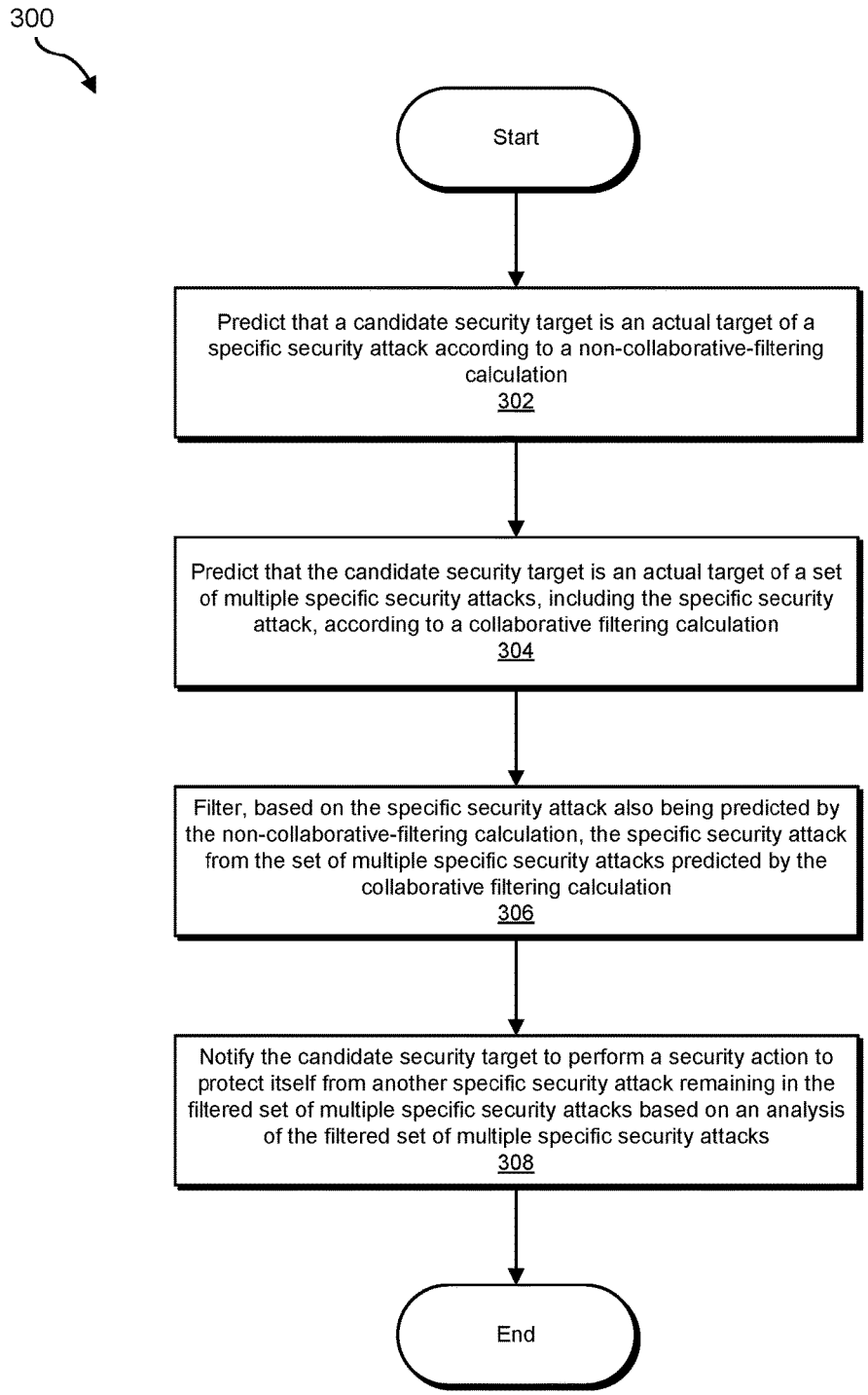
FIG. 3 is a flow diagram of an exemplary method for predicting security threats.

FIG. 3 is a flow diagram of an exemplary computer-implemented method 300 for predicting security threats. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may predict that a candidate security target is an actual target of a specific security attack according to a non-collaborative-filtering calculation. For example, prediction module 104 may, as part of server 206 in FIG. 2, predict that candidate security target 210 is an actual target of a specific security attack according to a non-collaborative-filtering calculation.

As used herein, the term "specific security attack" generally refers to a malware threat or other cybersecurity attack that a security system distinguishes from other malware threats or attacks, such as by using a code, identifier, hash, and/or categorization. The security attack may be "specific" in that the security attack is identified as corresponding to a specific exploit, vulnerability, signature, cluster, family, and/or methodology of attack. Accordingly, a security system may group together variants of the same essential security attack, such as polymorphic variants, such that all of these variants refer to the same essential "specific security attack." In alternative embodiments, the disclosed systems and methods may substitute "security attack(s)" for "specific security attack(s)."

As used herein, the phrase "predict that a candidate security target is an actual target" generally refers to a prediction by a computerized security threat prediction system that a candidate security target, such as an enterprise organization, has been attacked or will be attacked in the future. Moreover, the term "candidate security target," as used herein, generally refers to a potential security target, such as an enterprise organization, that is a candidate for a cybersecurity attack. For example, the candidate security target may have triggered or purchased cyber security prediction services and/or actually experienced a security attack. Examples of candidate security targets may include computing resources, including software, hardware, virtual, network, proxy, storage, and/or data resources, individuals and groups of individuals, organizations, and/or businesses, such as enterprise organizations.

Furthermore, as used herein, the term "non-collaborative-filtering calculation" generally refers to a calculation that is not a collaborative filtering calculation or algorithm. The term "collaborative filtering calculation" is defined further below in connection with step 304 of FIG. 3. Additionally, the non-collaborative-filtering calculation is generally distinct from the collaborative filtering calculation of step 304 such that the results of the non-collaborative-filtering calculation that overlap with the results of the collaborative filtering calculation can be filtered, in accordance with step 306, from the results of the collaborative filtering calculation to reveal a remaining filtered set of results or predictions that are more personalized or customized for the candidate security target. Moreover, the non-collaborative-filtering calculation generally produces threat predictions that are less customized to apply specifically to the candidate security target than the collaborative filtering calculation of step 304. For example, the non-collaborative-filtering calculation may simply make a prediction that a particular security attack will be directed to a particular security target based on an overall success level or pervasiveness of the particular security attack and/or on an overall level of victimization and/or vulnerability of the security target, without necessarily indicating any particular suitability or matching between the particular security attack and the security target, as discussed further below in connection with FIG. 4.

Prediction module 104 may predict that the candidate security target is an actual target of the specific security attack in a variety of ways. In some examples, prediction module 104 may predict that the candidate security target is the actual target of the specific security attack according to the non-collaborative-filtering calculation based on both: (1) a count for the candidate security target, among candidate security targets under analysis, in terms of previous attacks on the candidate security target and (2) a count for the specific security attack, among security attacks under analysis, in terms of previous instances of the specific security attack. To help illustrate this concept, FIG. 4 shows a sparse matrix 400 that further shows detected attacks by a malware 402, a malware 404, a malware 406, and a malware 408 on an enterprise organization 410, an enterprise organization 412, an enterprise organization 414, an enterprise organization 416, an enterprise organization 418, and an enterprise organization 420, respectively. As further shown according to sparse matrix 400, the following attacks have been detected: malware 402 on enterprise organization 410, malware 402 and malware 404 on enterprise organization 412, malware 402 on enterprise organization 418, and malware 404, malware 406, and malware 408 on enterprise organization 420. Notably, as used herein, the term "sparse matrix" generally has the same meaning as used in numerical analysis to refer to a matrix having entries that are substantially all or predominantly zero, as suitable for the collaborative filtering calculations described herein, and consistent with the reality that any specific strain of malware will likely only have targeted or attacked a small fraction of known enterprise organizations within a data set. Accordingly, the Wikipedia article for "sparse matrix," accessed 17 Feb. 2016, is hereby incorporated by reference in its entirety.

FIG. 4 further shows enterprise counts 450 and malware counts 460. Enterprise counts 450 lists the count of different malware attacks detected on each respective enterprise organization. For example, sparse matrix 400 shows that only a single malware attack, malware 402, was detected on enterprise organization 410. Accordingly, in enterprise counts 450, the entry for enterprise organization 410 shows a count of "1." Similarly, malware counts 460 lists the count of different enterprise organizations that a specific malware attack was detected as targeting. For example, sparse matrix 400 shows that malware 402 was detected at enterprise organization 410, enterprise organization 412, and enterprise organization 418. Accordingly, malware counts 460 lists a count of "3" at the corresponding entry for malware 402.

In some examples, prediction module 104 may predict that the candidate security target is the actual target of the specific security attack according to the non-collaborative-filtering calculation by calculating a product of the count for the candidate security target and the count for the specific security attack. Referring again to FIG. 4, a product matrix 470 shows the product of a respective count from enterprise counts 450 and a count from malware counts 460 in corresponding entries that match enterprise organizations to malware samples. For example, the entry for malware 404 and enterprise organization 410 shows a product of "2," which corresponds to the count of "1" for enterprise organization 410 from enterprise counts 450 multiplied by the count of "2" from malware counts 460 for malware 404 (i.e., "1" multiplied by "2" is "2"). Similarly, the entry for malware 402 and enterprise organization 420 within product matrix 470 shows a product of "9," which corresponds to the count of "3" from the entry within enterprise counts 450 for enterprise organization 420 multiplied by the count of "3" from the entry for malware 402 within malware counts 460. Notably, certain entries within product matrix 470 show an "X," which indicates that the corresponding malware has already been detected at the corresponding enterprise organization and so no product calculation is necessary for further prediction.

In general, prediction module 104 may predict that the candidate security target is an actual target of the specific security attack based on the corresponding entry in enterprise counts 450 and/or malware counts 460. For example, prediction module 104 may predict that the candidate security target is an actual target if a corresponding value satisfies a security threshold. In more specific examples, prediction module 104 may evaluate whether a count, product value, and/or rank of the count or product value satisfies a predetermined absolute value threshold and/or a predetermined percentage-based threshold. Referring to enterprise organization 420 and malware 402, prediction module 104 may determine whether the absolute value of "3" in enterprise counts 450 exceeds a predetermined threshold of "2" and/or exceeds 70% of the counts listed in enterprise counts 450. Similarly, prediction module 104 may determine whether the absolute value of "3" in malware counts 460 exceeds a predetermined threshold of "2" and/or exceeds 70% of the counts listed in malware counts 460. Additionally, prediction module 104 may determine whether the product of "9" listed in product matrix 470 exceeds a predetermined threshold of "5" and/or exceeds 70% of the product values listed in product matrix 470. In general, prediction module 104 may establish an absolute value threshold and/or percentage-based threshold for comparison with a count, product value, and/or rank of a count or product value based on an analysis of values listed within enterprise counts 450, malware counts 460, and/or product matrix 470. Prediction module 104 may also establish the absolute value threshold and/or percentage-based threshold by receiving administrator input.

In alternative embodiments, prediction module 104 may compare a rank of a count value or a rank of a product value with a predetermined absolute value threshold and/or a predetermined percentage-based threshold. For example, enterprise organization 420 has the highest rank in enterprise counts 450 (i.e., rank 1), because enterprise organization 420 has the highest count of "3" within enterprise counts 450. Similarly, enterprise organization 420 and malware 402 have the highest product value of "9" within product matrix 470. More generally, prediction module 104 may predict that the candidate security target is the actual target based on any one or more of the values and/or calculations outlined above.

At step 304, one or more of the systems described herein may predict that the candidate security target is an actual target of a set of multiple specific security attacks, including the specific security attack, according to a collaborative filtering calculation that makes predictions that are more customized to the candidate security target than predictions that the non-collaborative-filtering calculation makes. For example, prediction module 104 may, as part of server 206 in FIG. 2, predict that candidate security target 210 is an actual target of set 212 of multiple specific security attacks, including the specific security attack, according to a collaborative filtering calculation that makes predictions that are more customized to candidate security target 210 than predictions that the non-collaborative-filtering calculation makes.

As used herein, the term "collaborative filtering calculation" generally refers to any calculation that predicts that the candidate security target is an actual target based on an analysis of both (1) a data set indicating actual detected security attacks at multiple security targets and (2) a consideration of how similar or related the candidate security target is to other security targets within the data set that were detected as actual targets of the specific security attack. Notably, a non-collaborative-filtering calculation may differ from a collaborative filtering calculation in the sense that the non-collaborative-filtering calculation may predict that the candidate security target is an actual target of the specific security attack based on an analysis of an overall success or prevalence of the specific security attack and/or an overall vulnerability of the candidate security target, without consideration of how similar or related the candidate security target is to other actual detected targets of the specific security attack.

Collaborative filtering is further discussed in the following related application, "SYSTEMS AND METHODS FOR PREDICTING SECURITY THREAT ATTACKS," by Yining Wang, Christopher Gates, Kevin Roundy, and Nikolaos Vasiloglou, in U.S. patent application Ser. No. 14/974,583, filed 18 Dec. 2015, which is hereby incorporated by reference in its entirety. Additionally, the following articles further discuss collaborative filtering and associated recommendation systems, and are each hereby incorporated in their entirety: "Matrix Factorization: A Simple Tutorial and Implementation in Python," by Albert Au Yeung, last accessed at http://www.quuxlabs.com/blog/2010/09/matrix-factorization-a-simple-tutorial-and-implementation-in-python/on 17 Feb. 2016, "Role of Matrix Factorization Model in Collaborative Filtering Algorithm: A Survey," by Bokde et al., in International Journal of Advance Foundation and Research in Computer (IJAFRC), Volume 1, Issue 6, May 2014, last accessed at http://arxiv.org/ftp/arxiv/papers/1503/1503.07475.pdf on 17 Feb. 2016, "MATRIX FACTORIZATION TECHNIQUES FOR RECOMMENDER SYSTEMS," by Koren et al., Computer, Volume 42, Issue 8, August 2009, last accessed at http://www.columbia.edu/~jwp2128/Teaching/W4721/papers/ieeecomputer.pdf on 17 Feb. 2016, and "Chapter 9: Recommendation Systems," last accessed at http://infolab.stanford.edu/~ullman/mmds/ch9.pdf on 17 Feb. 2016. In general, these publications describe how collaborative filtering and/or matrix factorization techniques have been applied to recommendation systems for recommending content, such as movies and television provided by services such as NETFLIX. In contrast, the disclosed systems and methods may leverage or reengineer these collaborative filtering and/or matrix factorization techniques to recommend (i.e., predict) specific security attacks instead of consumer content or products.

Returning to FIG. 4, a collaborative filtering calculation may determine that enterprise organization 410 has a high level of similarity or relatedness to enterprise organization 412, which prediction module 104 has quantified and determined that the quantified level of similarity satisfies a predetermined similarity metric threshold. The level of similarity may be based on a similarity of detected attack patterns, as indicated by sparse matrix 400 within FIG. 4, and/or based on other features indicating the similarity between these two enterprise organizations (yet not necessarily shown by sparse matrix 400). Based on the quantified level of similarity, and based on the detection of malware 404 at enterprise organization 412, prediction module 104 may, according to a collaborative filtering calculation, predict that enterprise organization 410 will also be a target of malware 404. More generally, prediction module 104 may perform a collaborative filtering calculation to determine that the attack pattern for enterprise organization 410 will resemble the attack pattern for enterprise organization 412 based on a determination that these two enterprise organizations have a level of similarity or relatedness, as outlined above. In terms of FIG. 2, prediction module 104 may, according to a collaborative filtering calculation, predict that the candidate security target is an actual target of both attack 216 and attack 218 within set 212.

Figure 5:
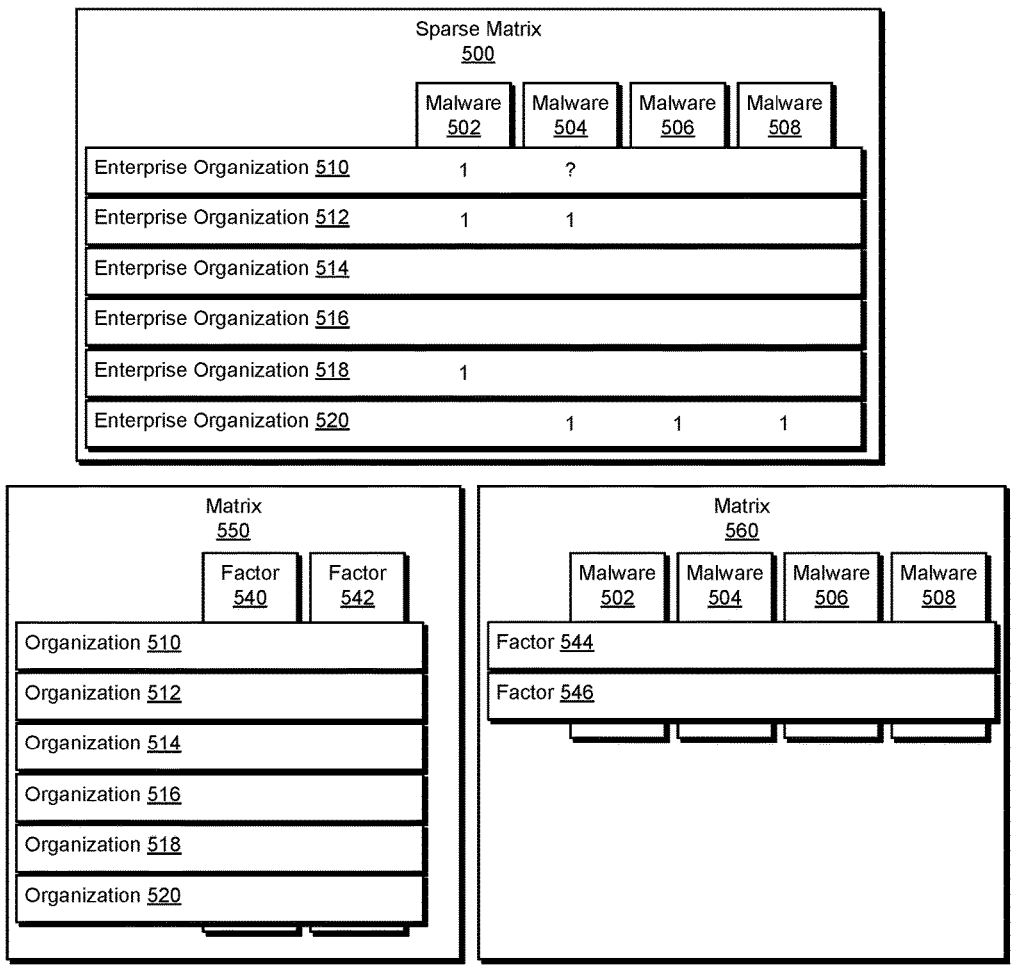
FIG. 5 is another block diagram of the exemplary sparse matrix that the disclosed systems may factor to predict security threats.

With reference to FIG. 5, prediction module 104 may perform the collaborative filtering calculation at least in part by factoring a sparse matrix 500, which may correspond to sparse matrix 400 in FIG. 4. For example, prediction module 104 may perform a matrix factorization to factor sparse matrix 502 into a matrix 550 and a matrix 560, thereby revealing a number of latent factors, including a factor 540, a factor 542, a factor 544, and a factor 546. These latent factors may correspond to numerical values that enable prediction module 104 to reproduce the non-blank entries in sparse matrix 500 by simply multiplying the simpler and smaller matrices of matrix 550 and matrix 560. In other words, the revealed latent factors may correspond to underlying attributes and/or variables that enable prediction module 104 to reduce the complexity of sparse matrix 500.

After identifying suitable smaller matrices such as matrix 550 and matrix 560 that approximately reproduce the non-blank entries of sparse matrix 500 (thereby satisfying a correctness or approximation threshold), prediction module 104 may then refer to the multiplication of these two smaller matrices to fill in the blank entries of sparse matrix 500, thereby making predictions about whether the corresponding enterprise organization is an actual target of the corresponding malware (e.g., determining whether the value at the entry within the matrix resulting from the matrix multiplication exceeds a predetermined value). Additional details of matrix factorization in collaborative filtering and recommendation systems are discussed in the articles listed above and incorporated by reference in their entireties.

At step 306, one or more of the systems described herein may filter, based on the specific security attack also being predicted by the non-collaborative-filtering calculation, the specific security attack from the set of multiple specific security attacks predicted by the collaborative filtering calculation. For example, filtering module 106 may, as part of server 206 in FIG. 2, filter, based on attack 216 also being predicted by the non-collaborative-filtering calculation, attack 216 from set 212 of multiple specific security attacks predicted by the collaborative filtering calculation (as indicated by the dashed line around attack 216 in FIG. 2).

Filtering module 106 may filter the specific security attack in a variety of ways. In general, filtering module 106 may remove the specific security attack from a set of specific security attacks (i.e., the set predicted by the collaborative filtering calculation). In the example of FIG. 2, filtering module 106 may remove attack 216 from set 212, thereby leaving a remaining filtered set that only includes attack 218 without further including attack 216. In this example, attack 216 may correspond to an attack that prediction module 104 predicts at step 302 simply due to an overall success or prevalence of attack 216 and/or an overall vulnerability of the candidate security target (e.g., as discussed above in connection with FIG. 4), without further indicating that the candidate security target has any unique or personalized susceptibility to attack 216. In other words, attack 216 may be an attack that prediction module 104 predicts would likely target any enterprise organization with a sufficient level of vulnerability. Accordingly, the prediction for attack 216 may not be particularly helpful or insightful for the candidate security target.

In general, filtering module 106 may filter each and every specific security attack from set 212 that is also predicted by the non-collaborative-filtering calculation performed at step 302. In other words, prediction module 104 may identify overlapping specific security attacks that overlap between both a set of specific security attacks predicted according to the non-collaborative-filtering calculation and the set of multiple specific security attacks predicted according to the collaborative filtering calculation. Filtering module 106 may filter each of the overlapping specific security attacks from the set of multiple specific security attacks predicted by the collaborative filtering calculation. In alternative embodiments, filtering module 106 may simply filter one, some, or substantially all of the overlapping specific security attacks without necessarily filtering each and every one of the overlapping specific security attacks.

At step 308, one or more of the systems described herein may notify the candidate security target to perform a security action to protect itself from another specific security attack remaining in the filtered set of multiple specific security attacks based on an analysis of the filtered set of multiple specific security attacks. For example, notification module 108 may, as part of server 206 in FIG. 2, notify candidate security target 210 to perform a security action to protect itself from attack 218 remaining in filtered set 212 of multiple specific security attacks based on analysis 214 of filtered set 212 of multiple specific security attacks.

As used herein, the term "security action" generally refers to any action or output (e.g., by a computerized security system) that helps protect a candidate security target from a corresponding security threat. Examples of suitable security actions include updating a malware signature database, updating one or more commercial or published applications to a more recent and/or secure version, executing a malware inoculation program, increasing one or more security barriers, such as a sandbox, quarantining, and/or firewall barrier, disconnecting, isolating, and/or powering down one or more computing resources, and/or generally increasing or heightening one or more security measures, such as security system settings, prompts, obstacles, password strength requirements, password renewal requirements, and/or corresponding notifications. Moreover, in general, notification module 108 may trigger the transmission of the notification through any suitable notification mechanism, such as email, text message, application prompt or pop-up, web-based social network messaging, voice message, and/or physical postal service.

Notification module 108 may notify the candidate security target about the predicted other specific security attack (e.g., attack 218) in a variety of ways. In general, notification module 108 may extract attributes of the candidate security target and/or the other specific security attack to explain what specific attack mechanisms and/or target vulnerabilities are enabling the attack. By way of background, the results of a collaborative filtering calculation can be highly insightful in revealing security attacks that otherwise would remain unpredictable. Nevertheless, collaborative filtering calculations can be famously difficult to read or understand, because the collaborative filtering calculations to not necessarily explain why or how a predicted target is an actual target of a specific security attack, thereby leaving the predicted target wondering about the underlying attack mechanism and/or vulnerabilities that the attack is exploiting. Accordingly, notification module 108 may leverage one or more machine learning algorithms, such as a naïve Bayes algorithm, to match or correlate attributes of the candidate security target and/or the other specific security attack to the results of the collaborative filtering calculation, thereby revealing more specific attributes, attack mechanisms, and/or target vulnerabilities that further explain why and how the candidate security target is a predicted actual target of the other specific security attack.

More generally, notification module 108 may (1) extract a risk factor that indicates why and/or how the candidate security target is predicted to be an actual target of the specific security attack, (2) notify the candidate security target of the risk factor, and/or (3) notify the candidate security target to perform a security action that is based on the extracted risk factor to remove or inoculate the extracted risk factor. And, more comprehensively, attributes and/or risk factors that notification module 108 may correlate to predicted security attacks may include: an identifier or categorization of an attack vector or methodology (e.g., spear phishing) or target of malware, geography of target locations or attack origin, company identifier (and indication of whether the company is multinational), attacker identity, a measured level of expertise indicated by the attack, a measured level of expertise of the target, a level of funding associated with the attack and/or target, whether the attack corresponds to a criminal enterprise and/or nation state actor, a goal of the attack campaign (e.g., theft, destruction or denial of service, etc.), company attributes (e.g., a number of machines, a market capitalization, a customer sector, identifier(s) of software installed, a measured amount of network traffic outside firewalls, a measured amount of email traffic from external entities, etc.), and/or exploit attributes (e.g., an identifier of software targeted by the exploit, a measured level of how ubiquitous is the targeted software, and/or a measured level of difficulty of creating/performing the exploit).

In one embodiment, notification module 108 may be programmed to perform the analysis of the filtered set of multiple specific security attacks by (1) identifying attributes of the candidate security target and (2) calculating, according to a machine learning algorithm, a level of predictive power for each of the attributes in predicting specific security attacks remaining in the filtered set of multiple specific security attacks. These attributes may include at least one of (1) an identifier of a customer sector and/or (2) an identifier of software installed by a customer. Accordingly, notification module 108 may notify the candidate security target that the candidate security target is a predicted actual target of the other specific security attack and also explain why and/or how the candidate security target is the predicted actual target (e.g., because the candidate security target is a member of a customer sector that is targeted by the other specific security attack and/or because the candidate security target has installed a specific software application or package that is targeted by the other specific security attack).

In further examples, notification module 108 may be programmed to perform the analysis of the filtered set of multiple specific security attacks by categorizing specific security attacks in the set of multiple specific security attacks into categories that each indicates a type of security attack. For example, notification module 108 may categorize a specific security attack into a category that corresponds to targeted threats. Notification module 108 may further identify attributes of one or more of the multiple specific security attacks remaining in the filtered set of specific security attacks. Additionally, notification module 108 may calculate, according to a machine learning algorithm such as a naïve Bayes algorithm, a level of predictive power for each of the attributes in predicting specific security attacks remaining in the filtered set of multiple specific security attacks. Furthermore, notification module 108 may determine that a particular category or class of threat is predicted to affect a candidate security target more or less frequently than expected. In response, notification module 108 may further execute a machine learning algorithm to extract features or attributes of the candidate security target that correlate with the predicted attacks for that category or class of threat, thereby further explaining why and/or how the candidate security target is especially vulnerable to that category or class of threat.

Moreover, all of the attempts by notification module 108 to extract features of the candidate security target and/or other specific security attack that correlate with predicted actual attacks will be more successful in view of filtering step 306, as outlined above, which removes predictions that do not indicate any particular match or suitability between a candidate security target and a specific security attack. In other words, filtering step 306 generates a remaining filtered set of predicted attacks such that each member of the remaining filtered set should indicate a more customized or personalized vulnerability of the candidate security target to the corresponding specific security attack. Accordingly, each specific security attack predicted in the remaining filtered set should be based on one or more underlying attributes that notification module 108 may successfully extract, thereby further explaining why and/or how the candidate security target is predicted to be an actual target.

The discussion of FIG. 3 above provides a detailed explanation of the disclosed systems and methods. Additionally, the following discussion provides a higher level overview of various embodiments of the disclosed systems and methods.

State of the art attack predictions, such as those produced by collaborative filtering, may be notoriously uninterpretable. Customers are ultimately not so interested in what exactly they are likely to be infected with as they are in knowing what kinds of things they are likely to be infected with, and why they are at risk, as this allows them to determine what they might be able to do about it.

Given a matrix of customers and threats that are predicted to infect those customers, it would be desirable to answer the following questions. What is the customer's level of risk to different categories of threats, relative to an industry baseline? In particular, what is the customer's risk for targeted threats (measured as threats that disproportionately target enterprises)? What is the customer's risk level for generic threats that affect most enterprises equally? An elevated risk indicates poor adherence to best practices. What is the customer's risk for various categories of threats: established malware and malware identified as novel according to a backend security database of a computer security vendor? Why is the customer predicted to be targeted by a particular threat or type of threat? The disclosed systems and methods may answer one or more of these questions in accordance with method 300 shown in FIG. 3, as outlined above. Additionally, it would also be desirable for a software security product to perform the following functions: (1) detect threats tied to benign software deployed by the customer, (2) identify predicted threats tied to particular vulnerabilities, (3) identify threats disproportionately targeting the customer's sector, and/or (4) identify threats tied to a particular operating system or operating system version.

As a first step, the disclosed systems and methods may identify, through a non-collaborative-filtering calculation, threats that are not tied to any particular risk factors. In particular, some threats affect all enterprises uniformly based only on their overall security and size, and are not tied to risk. With this baseline, the disclosed systems and methods are able to focus on samples that are more interesting by filtering the baseline or non-collaborative-filtering results from other results that are more insightful (e.g., collaborative filtering results). After performing this filtering step, the disclosed systems and methods may then identify the key risk factors that make a company susceptible to particular types of threats.

In accordance with a first stage, the disclosed systems and methods may construct an algorithm that is the optimal solution for attack prediction if the model is forced to adopt the simplistic assumption that attacks affect enterprises based only on their overall level of protection. The disclosed systems and methods construct a matrix of customer rows (usually enterprises) and malware samples (or clusters of malware samples) as columns. Each cell of the matrix may be populated with a "1" if the corresponding customer was infected by the corresponding malware sample, and "0" otherwise. The disclosed systems and methods measure the number of customers that each malware sample infected to identify the prevalence of each malware sample. The disclosed systems and methods also calculate the number of infections that each customer is infected with, thereby identifying the customers that are most likely to be infected. With this algorithm, the disclosed systems and methods can thereby identify the most probable customer infections by taking the product of the frequency values for the customer and the malware. The larger the product, the more likely the infection is to take place. The above algorithm provides an excellent baseline that identifies infections that have no preference for one customer over another.

By filtering out any predictions made by collaborative filtering that overlap with the baseline's predictions, the disclosed systems and methods eliminate highly prevalent security attacks. After this filtering step, infection predictions remain that are closely tied to a customer's risk factors, enabling the disclosed systems and methods to answer the questions that customers want to know about by extracting those risk factors (e.g., through machine learning, as discussed above and further discussed below).

In a second stage, the next task is to identify customer attributes that make them disproportionately likely to be tied to different classes of threats, or to all threats. The disclosed systems and methods break down threat types based on the detection technologies that identified the threat, on the virus names, and/or by crawling threat data (such as a security vendor threat blog) to identify targeted threats and other classes of threats. For each customer attribute (such as the customer's sector, the software installed by the customer, and/or the operating system that the customer uses), the disclosed systems and methods use a naive Bayes methodology to identify the predictiveness of each attribute. The most predictive attributes (i.e., those that satisfy a threshold along a metric of predictive power) are risk factors that cause the customer to be at higher risk of infection.

Conversely, the disclosed systems and methods also determine whether particular aspects of threats result in a customer having a higher or lower propensity to be infected. For instance, the disclosed systems and methods identify threats tied to a known class of vulnerabilities and determine whether the customer's rate of infection is higher or lower than expected. Similarly, the disclosed systems and methods determine whether a particular class of threat (e.g., targeted threats) is predicted to affect a company more or less frequently than expected. If the rate of infection is elevated, the disclosed systems and methods apply the aforementioned machine learning techniques to identify the customer attributes that correlate with the elevated higher risk.

Figure 6:
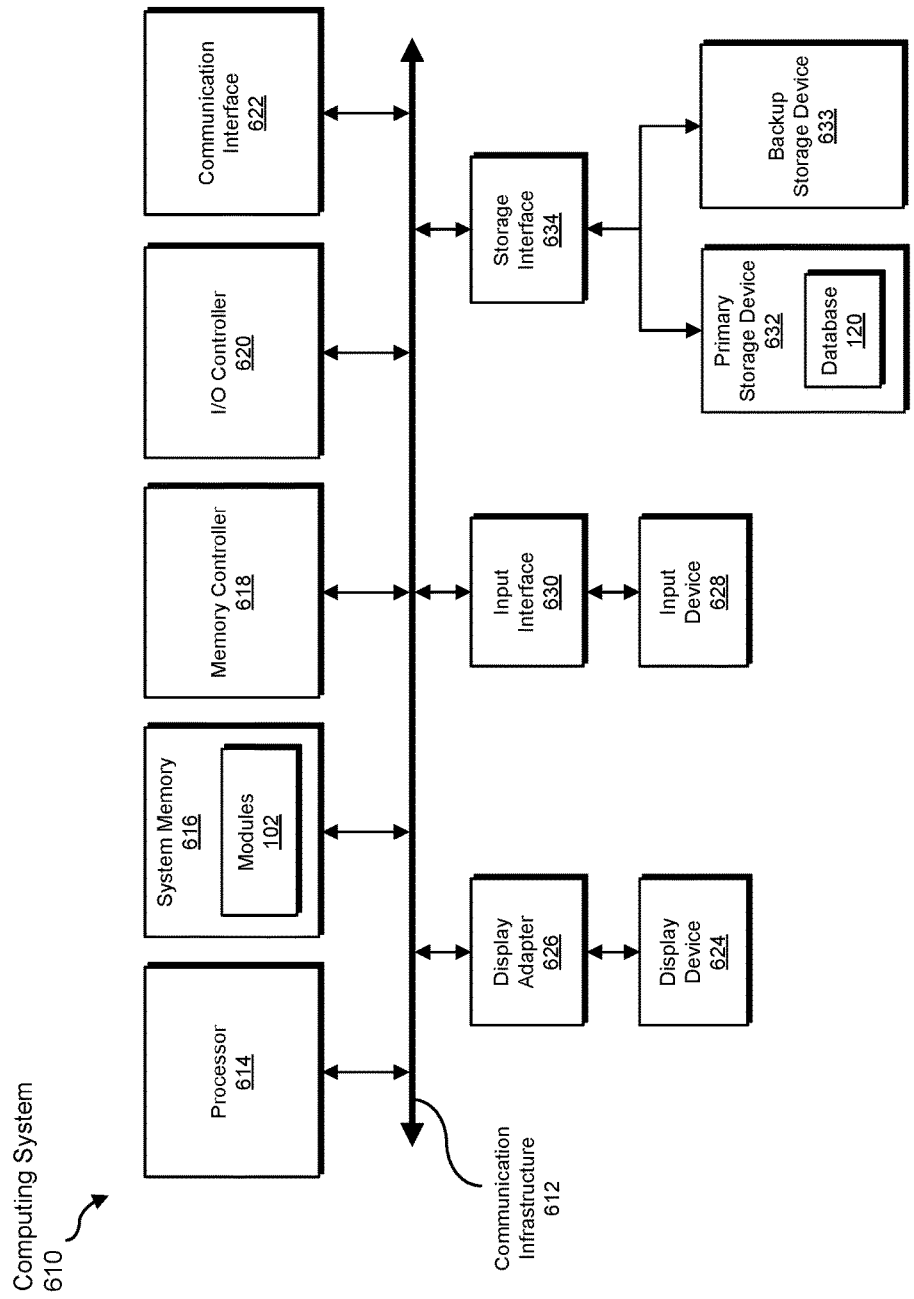
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
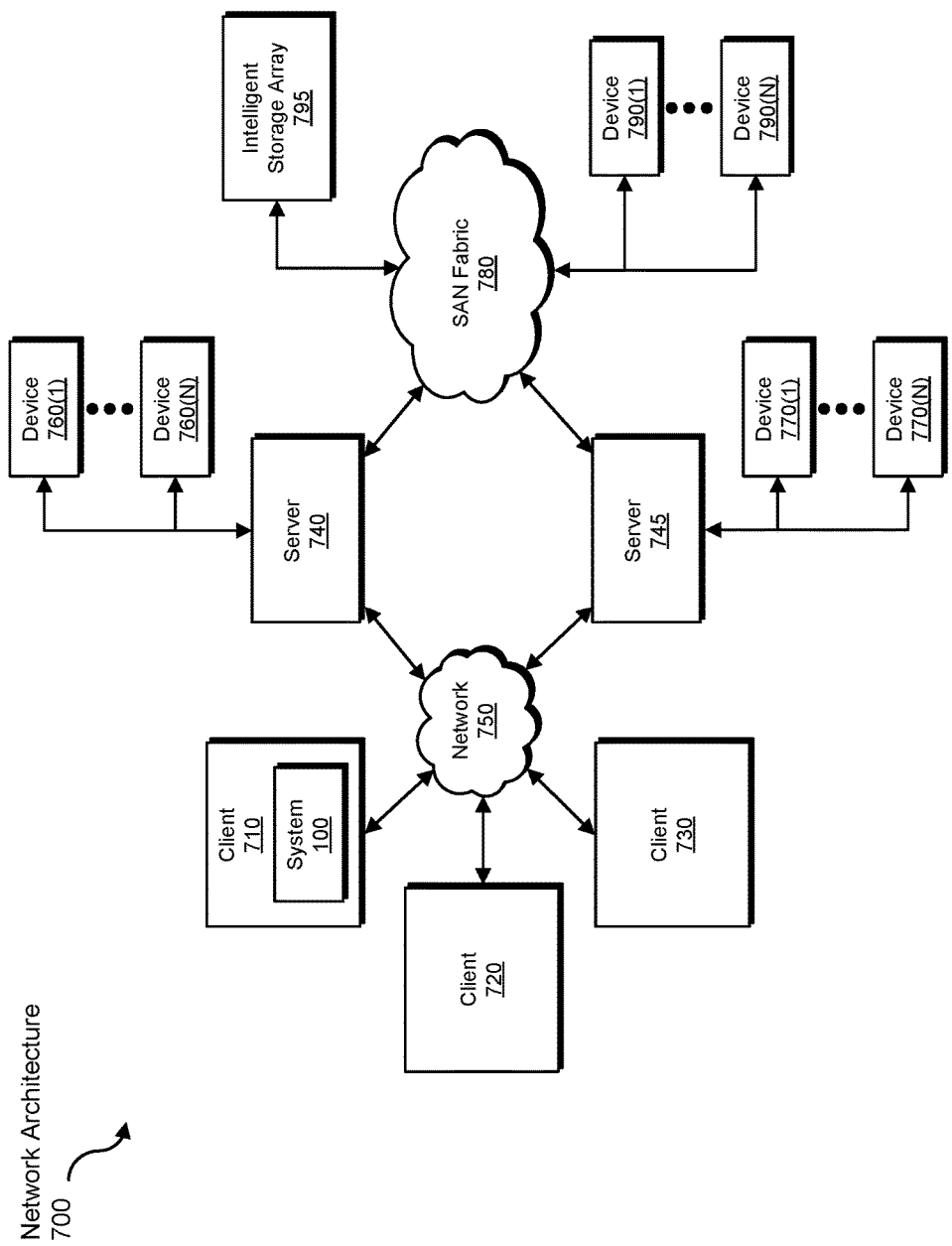
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for predicting security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for predicting security threats, at least a portion of the method being performed by a computing device comprising at least one processor, the method comprising:
   predicting that a candidate security target is an actual target of a specific security attack according to a non-collaborative-filtering calculation;
   predicting that the candidate security target is an actual target of a set of multiple specific security attacks, including the specific security attack, according to a collaborative filtering calculation that makes predictions that are more customized to the candidate security target than predictions that the non-collaborative-filtering calculation makes;
   filtering, based on the specific security attack also being predicted by the non-collaborative-filtering calculation, the specific security attack from the set of multiple specific security attacks predicted by the collaborative filtering calculation at least in part by:
      identifying overlapping specific security attacks that overlap between both a set of specific security attacks predicted according to the non-collaborative-filtering calculation and the set of multiple specific security attacks predicted according to the collaborative filtering calculation; and
      filtering each of the overlapping specific security attacks from the set of multiple specific security attacks predicted by the collaborative filtering calculation; and
   notifying, by transmitting a notification, the candidate security target to perform a security action to protect itself from another specific security attack remaining in the filtered set of multiple specific security attacks based on an analysis of the filtered set of multiple specific security attacks.

2. The method of claim 1, wherein predicting that the candidate security target is the actual target of the specific security attack according to the non-collaborative-filtering calculation is based on both:
   a count for the candidate security target, among candidate security targets under analysis, in terms of previous attacks on the candidate security target; and
   a count for the specific security attack, among security attacks under analysis, in terms of previous instances of the specific security attack.

3. The method of claim 2, wherein predicting that the candidate security target is the actual target of the specific security attack according to the non-collaborative-filtering calculation comprises calculating a product of the count for the candidate security target and the count for the specific security attack.

4. The method of claim 1, wherein the analysis of the filtered set of multiple specific security attacks comprises:
   identifying attributes of the candidate security target; and
   calculating, according to a machine learning algorithm, a level of predictive power for each of the attributes in predicting specific security attacks remaining in the filtered set of multiple specific security attacks.

5. The method of claim 4, wherein the attributes comprise at least one of:
   an identifier of a customer sector; and
   an identifier of software installed by a customer.

6. The method of claim 4, wherein the machine learning algorithm comprises a naive Bayes algorithm.

7. The method of claim 1, wherein the analysis of the filtered set of multiple specific security attacks comprises categorizing specific security attacks in the set of multiple specific security attacks into categories that each indicates a type of security attack.

8. The method of claim 1, wherein the analysis of the filtered set of multiple specific security attacks comprises:
   identifying attributes of at least one of the multiple specific security attacks; and
   calculating, according to a machine learning algorithm, a level of predictive power for each of the attributes in predicting specific security attacks remaining in the filtered set of multiple specific security attacks.

9. The method of claim 1, wherein at least one of the non-collaborative-filtering calculation and the collaborative filtering calculation comprises constructing a matrix that specifies:
   candidate security targets along one of rows and columns of the matrix; and
   specific security attacks along the other of the rows and the columns of the matrix.

10. A system for predicting security threats, the system comprising:
   a prediction module, stored in memory, that:
      predicts that a candidate security target is an actual target of a specific security attack according to a non-collaborative-filtering calculation;
      predicts that the candidate security target is an actual target of a set of multiple specific security attacks, including the specific security attack, according to a collaborative filtering calculation that makes predictions that are more customized to the candidate security target than predictions that the non-collaborative-filtering calculation makes;
   a filtering module, stored in memory, that filters, based on the specific security attack also being predicted by the non-collaborative-filtering calculation, the specific security attack from the set of multiple specific security attacks predicted by the collaborative filtering calculation at least in part by:
      identifying overlapping specific security attacks that overlap between both a set of specific security attacks predicted according to the non-collaborative-filtering calculation and the set of multiple specific security attacks predicted according to the collaborative filtering calculation; and
      filtering each of the overlapping specific security attacks from the set of multiple specific security attacks predicted by the collaborative filtering calculation;
   a notification module, stored in memory, that notifies, by transmitting a notification, the candidate security target to perform a security action to protect itself from another specific security attack remaining in the filtered set of multiple specific security attacks based on an analysis of the filtered set of multiple specific security attacks; and
   at least one physical processor configured to execute the prediction module, the filtering module, and the notification module.

11. The system of claim 10, wherein the non-collaborative-filtering calculation is based on both:
   a count for the candidate security target, among candidate security targets under analysis, in terms of previous attacks on the candidate security target; and
   a count for the specific security attack, among security attacks under analysis, in terms of previous instances of the specific security attack.

12. The system of claim 11, wherein the prediction module predicts that the candidate security target is the actual target of the specific security attack according to the non-collaborative-filtering calculation by calculating a product of the count for the candidate security target and the count for the specific security attack.

13. The system of claim 10, wherein the notification module is programmed to perform the analysis of the filtered set of multiple specific security attacks by:
   identifying attributes of the candidate security target; and
   calculating, according to a machine learning algorithm, a level of predictive power for each of the attributes in predicting specific security attacks remaining in the filtered set of multiple specific security attacks.

14. The system of claim 13, wherein the attributes comprise at least one of:
   an identifier of a customer sector; and
   an identifier of software installed by a customer.

15. The system of claim 13, wherein the machine learning algorithm comprises a naive Bayes algorithm.

16. The system of claim 10, wherein the notification module is programmed to perform the analysis of the filtered set of multiple specific security attacks by categorizing specific security attacks in the set of multiple specific security attacks into categories that each indicates a type of security attack.

17. The system of claim 10, wherein the notification module is programmed to perform the analysis of the filtered set of multiple specific security attacks by:
   identifying attributes of at least one of the multiple specific security attacks; and
   calculating, according to a machine learning algorithm, a level of predictive power for each of the attributes in predicting specific security attacks remaining in the filtered set of multiple specific security attacks.

18. A non-transitory computer-readable medium comprising one or more computer-readable instructions that, when executed by at least one processor of a computing device, cause the computing device to:
- predict that a candidate security target is an actual target of a specific security attack according to a non-collaborative-filtering calculation;
- predict that the candidate security target is an actual target of a set of multiple specific security attacks, including the specific security attack, according to a collaborative filtering calculation that makes predictions that are more customized to the candidate security target than predictions that the non-collaborative-filtering calculation makes;
- filter, based on the specific security attack also being predicted by the non-collaborative-filtering calculation, the specific security attack from the set of multiple specific security attacks predicted by the collaborative filtering calculation at least in part by:
  - identifying overlapping specific security attacks that overlap between both a set of specific security attacks predicted according to the non-collaborative-filtering calculation and the set of multiple specific security attacks predicted according to the collaborative filtering calculation; and
  - filtering each of the overlapping specific security attacks from the set of multiple specific security attacks predicted by the collaborative filtering calculation; and
- notify, by transmitting a notification, the candidate security target to perform a security action to protect itself from another specific security attack remaining in the filtered set of multiple specific security attacks based on an analysis of the filtered set of multiple specific security attacks.

19. The method of claim 1, further comprising performing, by the candidate security target, the security action in response to the candidate security target receiving the notification.

20. The method of claim 19, wherein the security action comprises at least one of:
- updating a malware signature database;
- updating a published application to a more recent or secure version;
- executing a malware inoculation program;
- increasing a sandbox, quarantine, or firewall barrier;
- disconnecting, isolating, or powering down a computing resource; and
- heightening a security system setting.

* * * * *